Sept. 30, 1969 C. FELDMAN 3,470,426

THIN FILM CIRCUIT ELEMENT OF AMORPHOUS SEMICONDUCTOR
EXHIBITING A VOLTAGE VARIABLE NON-LINEAR RESISTANCE
WITH SYMMETRICAL CHARACTERISTICS

Filed Nov. 18, 1964

INVENTOR
CHARLES FELDMAN

BY Hurvitz + Rose

ATTORNEYS

United States Patent Office
3,470,426
Patented Sept. 30, 1969

3,470,426

THIN FILM CIRCUIT ELEMENT OF AMORPHOUS SEMICONDUCTOR EXHIBITING A VOLTAGE VARIABLE NON-LINEAR RESISTANCE WITH SYMMETRICAL CHARACTERISTICS

Charles Feldman, Alexandria, Va., assignor to Melpar, Inc., Falls Church, Va., a corporation of Delaware
Filed Nov. 18, 1964, Ser. No. 411,973
Int. Cl. H01l 5/02
U.S. Cl. 317—234 10 Claims

ABSTRACT OF THE DISCLOSURE

A thin film circuit element exhibiting a voltage variable non-linear resistance with a symmetrical characteristic curve is produced by securing a thin film of substantially pure amorphous semiconducting material of less than ten thousand angstroms in thickness between the relatively parallel opposed surfaces of a pair of spaced metal electrodes, the amorphous semiconducting material preferably an elemental semiconductor selected from the group consisting of boron, silicon, and germanium. A rectifying element having the aforementioned characteristic curve in the forward direction and a non-symmetrical high resistance curve in the reverse direction is obtained by further interposing a thin crystalline semiconducting film together with the amorphous film between the electrodes, the crystalline film bonded to one of the electrodes and to the amorphous film.

The present invention relates generally to thin film devices and, more particularly, to thin film devices having a layer selected from the group consisting of amorphous boron, germanium or silicon.

In conducting experimental work on the electrical properties of thin film devices, I have discovered that devices in which an amorphous semiconductor layer is placed between a pair of metal electrodes exhibit the voltage versus current characteristic of $i=AV^n$; where A is any constant; and $n$ is in excess of unity. With large values of $n$, e.g. $n>3$, as is the case with most devices fabricated, such a device is useful as a symmetrical varistor capable for utilization as a voltage regulator, limiter or safety switch. In specific experiments conducted, the amorphous semiconductor films have been boron, germanium and silicon although other amorphous films can be formed.

The device may also be fabricated as a non-symmetrical rectifying device by forming a thin film layer of crystalline semiconductor, preferably cadmium selenide (CdSe), between the amorphous layer and one of the electrodes. In the direction of forward bias, the rectifying device exhibits the $i=AV^n$ characteristics, while in the reverse direction, the device exhibits the gradual sloping, high impedance CdSe current versus voltage variation.

The distinction in conductance properties between amorphous and crystalline semiconductor layers is best seen by reference to the well known equation $\sigma=Ne\mu$, where:

$\sigma$=conductance,
N=number of carriers per cubic centimeter,
$e$=charge of an electron, and
$\mu$=mobility of the carriers.

The lower conductance amorphous semiconductor films, have a larger number of carriers but they are much less mobile than those of a crystal semiconductor because of their inability to support electron or hole wave motion. Thus, for amorphous semiconductor layers, N may be on the order of $10^{22}$ but $\mu$ is much less than one, between $10^{-1}$ and $10^{-6}$. In contrast, in typical crystalline semiconductors $\mu$ is greater (e.g. for crystalline Ge, $\mu$=2000) but the number of carriers is smaller (e.g. for crystalline Ge, $N\doteq10^{18}$).

It was found that, of the three amorphous layers mentioned, devices having the preferred characteristics were formed from very pure (at least 99.99%) boron. The boron devices were able to withstand the greatest breakdown voltages because their films apparently were completely amorphous; i.e., had no crystalline structure whatsoever. It was found with all three materials used to form amorphous layer that crystallization can be substantially prevented by maintaining the substrate on which the device is being formed at substantially room temperature when the amorphous layer is being deposited.

It is, accordingly, an object of the present invention to provide a new and improved thin film circuit device having an amorphous semiconductor layer and method of making same.

It is another object of the present invention to provide a new and improved thin film circuit device employing an amorphous layer of boron, germanium or silicon, and a method for making same.

It is another object of the invention to provide a new and improved thin film device having a voltage current characteristic in accordance with $i=AV^n$, where $n>1$.

An additional object of the invention is to provide a new and improved thin film symmetrical varistor having a voltage current characteristic, $i=AV^n$, where $n$ is considerably in excess of unity.

A further object of the invention is to provide a new and improved thin film rectifier having a sharp break point in its characteristic curve in the forward biasing direction and a gradually sloping, large impedance variation for reverse biasing.

The above and still further objects, features and advantages of the present invention will become apparent upon consideration of the following detailed description of one specific embodiment thereof, especially when taken in conjunction with the accompanying drawings, wherein.

Figure 1:
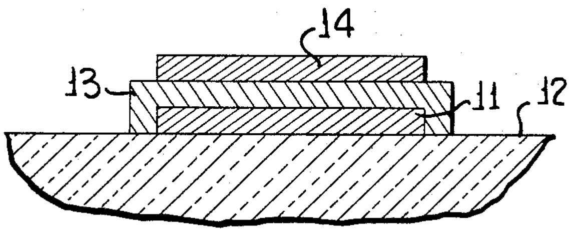
FIGURE 1 is a cross-sectional view of a stacked arrangement of a preferred embodiment of the present invention.

Reference is now made to FIGURE 1 of the drawings wherein metal electrode 11, which may, e.g., be aluminum, Nichrome or gold, is provided on insulating substrate 12. The thickness of layer 11 is on the order of 1,000 A. or less. Deposited on electrode 11 is a thin amorphous layer 13 of semiconducting material preferably selected from the group consisting of boron, silicon or germanium. Layer 13 typically ranges in thickness between approximately 1000 A. and 6000 A. On layer 13, there is provided a further metal electrode 14, of the same material and having approximately the same thickness as layer 11, but of course separated from it by thin amorphous semiconducting film 13.

In fabricating the device of FIGURE 1, metal layers 11 and 14 are deposited using conventional vacuum deposition techniques. After layer 11 is deposited, the substrate is removed from the vacuum chamber and placed in a different vacuum chamber that is outgassed and evacuated to $10^{-5}$ mm. of mercury. The second vacuum chamber, where layer 13 is deposited, is utilized because of the possibility of contaminating layer 13, as it is formed, with the residual metal vapors remaining in the first chamber.

If boron is the material utilized, it is necessary to provide a rod of this material that is at least 99.99% pure, and preferably 99.999% pure. Such a rod is available from L. Light and Company, Ltd., Colubrook, Bucks, England. If the boron is less than 99.99% pure the results described herein are not attained. The pure boron rod is heated to its boiling point with a 12 kilovolt, 120 milliampere electron beam to obtain a deposition rate of between 100 and 200 A. per minute. To avoid contamination, precautions must be taken to be sure that the beam is focused only on the rod and does not cause vaporization of any other materials in the chamber. Boron layer 13 is deposited with substrate 12 maintained preferably at room temperature (about 25° C.) to prevent crystallization. After deposition of layer 13, electrode 14 is conveniently deposited.

Figures 4, 5:
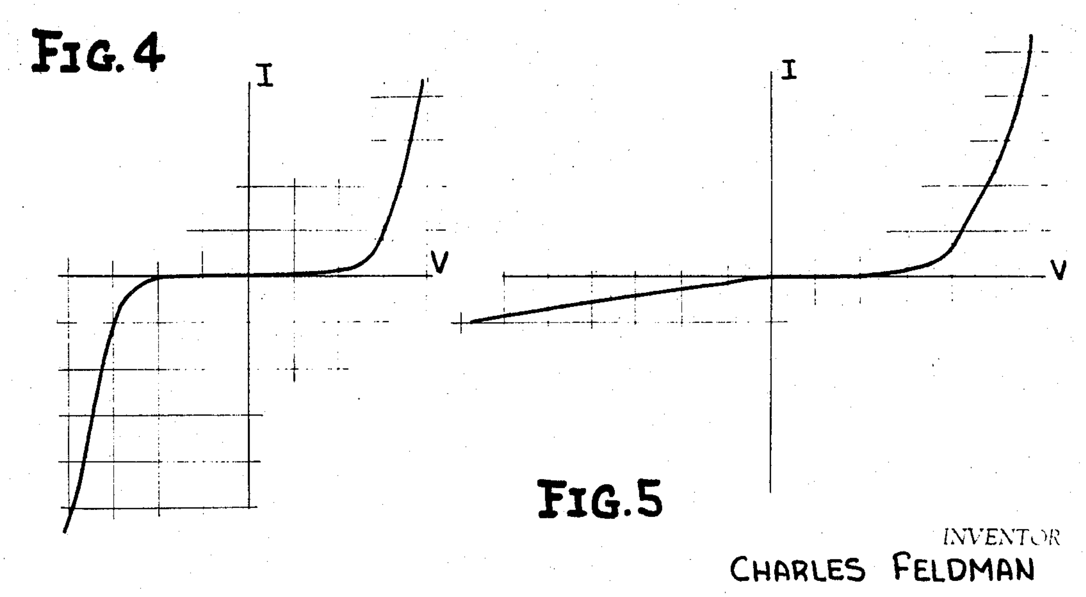
FIGURES 4 and 5 are characteristic curves of the devices of FIGURES 1 and 3, respectively.

It has been found that the devices of FIGURE 1 exhibit symmetrical varistor characteristics, as shown in FIGURE 4. In both the positive and negative voltage regions, the curve of FIGURE 4 can be shown to be represented by:

$$i = AV^n$$

where:

$i$=current flowing between electrodes 11 and 14,
A=constant,
V=voltage across electrodes 11 and 14, and
$n$=constant greater than one.

Because of the symmetrical nature of the curve, it is seen that $i$ is negative for all negative V, no matter what the value of $n$ is. Since $n$ is usually much greater than one, on the order of at least 3, there is a relatively sharp transitional point between the low and high impedance portions of the characteristic curve.

The properties of six typical devices are tabulated in Table I.

TABLE I.—PROPERTIES OF BORON FILMS

| Sample | $n$ (at room temp.) | A/cm.² | Thickness (A.) of layer 13 | Electrodes 11 and 14 |
|---|---|---|---|---|
| 1 | 6 | $2.2\times10^{-10}$ | 2,100 | Aluminum. |
| 2 | 7 | $2.0\times10^{-11}$ | 1,300 | Do. |
| 3 | 3.5 | $9.5\times10^{-5}$ | 2,400 | Do. |
| 4 | 6.6 | $8.1\times10^{-12}$ | 4,500 | Do. |
| 5 | 8.8 | $1.4\times10^{-11.8}$ | 2,400 | Do. |
| 6 | 8.2 | $2.6\times10^{-13}$ | 2,400 | Nichrome. |

In forming amorphous films 13 of germanium or silicon, the same method of fabrication as employed for boron is utilized except that electric current heating techniques are utilized for vaporizing the material instead of electron beam heating. This is because silicon and germanium have considerably lower boiling points than boron. With all of these materials, great precautions must be taken to make them as pure as possible and prevent contamination during deposition. Extremely pure germanium and silicon (purities greater than 99.99%) must also be used. While satisfactory devices have been fabricated from silicon and germanium, boron is generally preferred because the layer formed by it has more frequently been found amorphous than the silicon and germanium layers.

No serious problems were encountered regarding contamination in moving the substrate between deposition chambers. Also, my investigations indicate that oxidation of electrode 11 in transferring the substrate from one chamber to another does not materially influence the current conducting mechanism. This was demonstrated by substituting gold, a material that does not readily oxidize, for aluminum electrode 11 and observing virtually the same results tabulated.

As a result of X-ray diffraction tests on layer 13, I have determined that the films formed are completely amorphous. Another indication of the amorphous character of the films is provided by observing that the value of $n$ increases when the completed device is subjected liquid nitrogen temperatures. If layer 13 were crystalline, $n$ would decrease with low temperatures.

Figure 2:
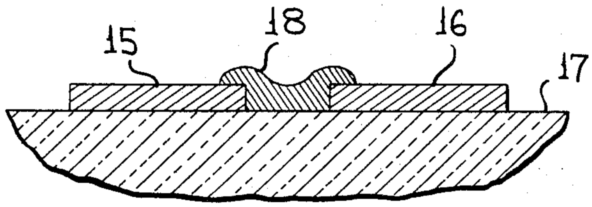
FIGURE 2 is a cross-sectional view of a planar configuration of the invention.

Reference is now made to FIGURE 2 of the drawings wherein another embodiment of the invention is illustrated. In this embodiment, metal planar electrodes 15 and 16 are both initially formed on quartz substance 17. Electrodes 15 and 16 are vacuum vapor deposited to a thickness on the order of 2000 A. and separated by approximately 0.5 mil. Amorphous boron, silicon or germanium layer 18 is then vacuum deposited to a thickness of about 2400 A. in the gap between electrodes 15 and 16, using the same procedure described supra.

A device of the type illustrated in FIGURE 2 having Nichrome electrodes and a boron layer 2400 A. thick was found to exhibit symmetrical varistor characteristics in accordance with $$i = 2.4\times10^{-8.8}V^{1.8}$$

Figure 3:
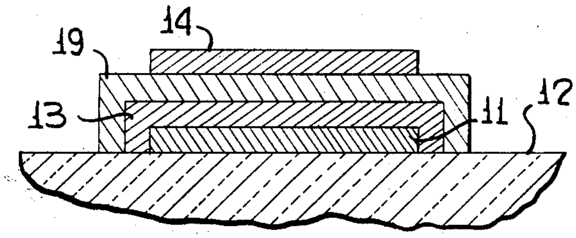
FIGURE 3 is a cross-sectional view of still another embodiment of the invention.

I have found that the stacked device of FIGURE 1 can be modified as illustrated in FIGURE 3 to be a rectifying element by depositing a crystalline semiconducting layer 19 on amorphous boron layer 13 prior to deposition of electrode 14. In a typical embodiment, layer 19 is cadmium selenide (CdSe) vacuum deposited to thickness of 8000 A. on a 2000 A. thick layer of boron. Layer 19 is deposited at the relatively rapid rate of 2000 A. per minute with substrate 12 at a relatively low temperature, less than 100° C., and is then annealed. For the thickness specified, annealing is accomplished by heating substrate 12 to about 300° C. for three minutes. When electrode 14 (FIGURE 3) is positively biased relative to electrode 11, I find that the device behaves substantially like the varistor of FIGURE 1, i.e. its voltage current characteristics is represented by: $i=AV^n$, where $n>3$. If electrode 14 is negatively biased relative to electrode 11, however, the conduction properties of cadium selenide layer 19 seem to predominate, whereby small currents are drawn for large voltages and no sharp transitional point in the characteristic appears. These results are verified in FIGURE 5, a plot of the voltage current characteristics of the FIGURE 3 rectifier.

While I have described and illustrated one specific embodiment of my invention, it will be clear that variations of the details of construction which are specifically illustrated and described may be resorted to without departing from the true spirit and scope of the invention as defined in the appended claims.

I claim:

1. A thin film rectifier comprising an insulating substrate having secured by deposition thereon, in stacked relationship, a pair of electrodes having interposed therebetween a thin film of amorphous boron of a thickness in the range from 1,000 Angstroms to 6,000 Angstroms and a thin film of cadmium selenide of less than approximately 8,000 Angstroms in thickness, said thin films bonded to each other and respective electrodes of said pair.

2. A thin film circuit device comprising a pair of metal electrodes having relatively parallel opposed surfaces separated by a gap of less than 10,000 Angstroms, a thin amorphous film consisting of a single element semiconductor of at least 99.99 percent purity filling said gap and secured to said electrodes, said device exhibiting a voltage variable non-linear resistance with a voltage-versus-current characteristic curve symmetrical about the current axis.

3. A thin film circuit element comprising a pair of metal electrodes having relatively parallel opposed surfaces separated by a gap of less than 10,000 Angstroms, a thin film of substantially pure amorphous semiconducting material filling said gap and secured to said electrodes, wherein said semiconducting material is an elemental semiconductor selected from the group consisting of boron, silicon and germanium, said circuit element exhibiting a voltage variable non-linear resistance with a voltage-versus-current axis.

4. The invention according to claim 3 wherein the thickness of said thin film, and hence the width of said gap, is within the range from 1,000 Angstroms to 6,000 Angstroms.

5. The invention according to claim 4 wherein said elemental semiconductor has a purity of at least 99.99 percent.

6. The invention according to claim 5 wherein each of said electrodes is a metal selected from the group consisting of aluminum, gold and Nichrome.

7. The invention according to claim 5 wherein said circuit element is secured to and supported by an insulative substrate.

8. A thin film rectifier comprising a pair of metal electrodes having relatively parallel opposed surfaces separated by a gap of less than 20,000 Angstroms, and a pair of thin semiconducting films, each of less than 10,000 Angstroms thickness, secured to each other and filling said gap, one of said thin semiconducting films having an amorphous structure and secured to one of said electrodes and the other of said thin semiconducting films having a crystalline structure and secured to the other of said electrodes.

9. The invention according to claim 8 wherein said thin amorphous semiconducting film is composed of substantially pure boron and has a thickness within the range from 1,000 Angstroms to 6,000 Angstroms.

10. The invention according to claim 9 wherein said crystalline semiconducting film is composed of cadmium selenide and has a thickness of less than approximately 8,000 Angstroms.

References Cited

UNITED STATES PATENTS

| | | | |
|---|---|---|---|
| 3,343,034 | 9/1967 | Ovshinsky | 317—11 |
| 2,780,569 | 2/1957 | Hewlett | 148—1.5 |

JOHN W. HUCKERT, Primary Examiner

M. EDLOW, Assistant Examiner

U.S. Cl. X.R.

29—195; 317—239, 240